United States Patent
Yang et al.

(10) Patent No.: US 11,619,497 B2
(45) Date of Patent: Apr. 4, 2023

(54) AUTONOMOUS VEHICLE NAVIGATION USING WITH COALESCING CONSTRAINTS FOR STATIC MAP DATA

(71) Applicant: Pony AI Inc., Grand Cayman (KY)

(72) Inventors: Mengda Yang, Sunnyvale, CA (US); Michael Wu, San Jose, CA (US); Ke Li, San Jose, CA (US); Piaoyang Cui, Santa Clara, CA (US)

(73) Assignee: Pony AI Inc., Grant Cayman (KY)

( * ) Notice: Subject to any disclaimer, the term of this patent is extended or adjusted under 35 U.S.C. 154(b) by 161 days.

(21) Appl. No.: 17/086,144

(22) Filed: Oct. 30, 2020

(65) Prior Publication Data

US 2022/0136838 A1 May 5, 2022

(51) Int. Cl.
*G01C 21/32* (2006.01)
*G05D 1/02* (2020.01)
*G06V 10/75* (2022.01)

(52) U.S. Cl.
CPC .......... *G01C 21/32* (2013.01); *G05D 1/0274* (2013.01); *G06V 10/757* (2022.01); *G05D 1/0248* (2013.01)

(58) Field of Classification Search
CPC ...... G01C 21/32; G01C 21/30; G05D 1/0274; G05D 1/0248; G05D 2201/0213; G06V 10/757; H04N 19/16; H04N 19/427; H04N 19/433; H04N 19/436; H04N 19/61; G01S 13/86; G01S 19/48; G01S 19/49; G06F 16/1767; G06F 16/185; G06F 16/1873; H03M 7/40; H03M 7/46
See application file for complete search history.

(56) References Cited

U.S. PATENT DOCUMENTS

| | | | |
|---|---|---|---|
| 9,140,792 B2* | 9/2015 | Zeng | G01S 19/45 |
| 2008/0285652 A1 | 11/2008 | Oxman et al. | |
| 2009/0228204 A1 | 9/2009 | Zavoli et al. | |
| 2012/0173606 A1* | 7/2012 | Becker | G01C 21/3667 709/203 |
| 2012/0221539 A1 | 8/2012 | Rose et al. | |
| 2017/0248963 A1 | 8/2017 | Levinson et al. | |

OTHER PUBLICATIONS

International Search Report and Written Opinion for PCT/US2021/057332 dated Jan. 31, 2022, 12 pages.

* cited by examiner

*Primary Examiner* — Rami Khatib (57) ABSTRACT

Systems, methods, and non-transitory computer readable media are provided for obtaining a slice of static map data comprising a plurality of blocks, each block comprising a plurality of cells, each, each cell having a cell value indicating a probability that an object is present in the cell; loading the slice into a cache memory of a parallel processor; arranging the static map data in the cache memory in contiguous memory spaces assigned to a group of workers of the parallel processor that have coalescing constraints; loading a frame of dynamic map data into the cache memory; obtaining a plurality of scan match candidates each representing a possible position and attitude of the vehicle; processing, in the parallel processor, the static and dynamic map data and the candidates to generate results each representing a candidate and score; and selecting the candidate having the highest score as a vehicle position.

20 Claims, 6 Drawing Sheets

AUTONOMOUS VEHICLE NAVIGATION USING WITH COALESCING CONSTRAINTS FOR STATIC MAP DATA

FIELD OF THE INVENTION

This disclosure relates to approaches for enhanced parallel processing of static map data.

BACKGROUND

Under conventional approaches, three-dimensional dynamic map data may be generated by a sensor based on observations of distances to objects (e.g., measurements of a scene using LIDAR), and may be processed with static map data, for example to determine locations of the sensor. These locations may be used, for example, in vehicle navigation. With the advent of increasingly powerful parallel processors, processing speed is no longer a bottleneck for this location determination. Instead, the speed of location determination is limited by memory access speeds.

SUMMARY

Various embodiments of the present disclosure may include systems, methods, and non-transitory computer readable media. In some embodiments, the method comprises: obtaining a slice of static map data representing a static geographical map, wherein each slice represents a horizontal region of the static geographical map, wherein each slice comprises a plurality of blocks, each block comprises a plurality of cells, each cell corresponds to a respective three-dimensional region of the static geographical map, and each cell has a cell value that indicates an object probability that an object is present in the cell; loading the slice of static map data into a cache memory of a parallel processor; arranging the static map data in the cache memory in contiguous memory spaces assigned to a group of workers, or processes, of the parallel processor that have coalescing constraints; obtaining a frame of dynamic map data, wherein the dynamic map data represents LIDAR data collected by a rotating LIDAR sensor on a vehicle; loading the frame of the dynamic map data into the cache memory of the parallel processor; obtaining a plurality of scan match candidates each representing a possible position and attitude of the vehicle; processing, in the parallel processor, the static map data, the dynamic map data, and the plurality of scan match candidates to generate one or more results, wherein each result represents one of the scan match candidates and a score for the one of the scan match candidates; and selecting the scan match candidate having the highest score as a position of the vehicle.

In some embodiments, the instructions further cause the system to perform: obtaining a further frame of the dynamic map data; loading the further frame of the dynamic map data into the cache memory of the parallel processor; obtaining a further plurality of the scan match candidates; processing, in the parallel processor, the further frame of the dynamic map data, the further plurality of the scan match candidates, and the static map data, to generate one or more further results, wherein each further result represents a further one of the scan match candidates and a further score for the one of the scan match candidates; and selecting the further scan match candidate having the highest score as a further position of the vehicle.

In some embodiments, the slice of static map data comprises a block occupancy mask that identifies blocks containing at least one cell with a non-zero cell value; and loading the slice of static map data into a cache memory of a parallel processor comprises: loading only blocks identified by the block occupancy mask.

In some embodiments, the block occupancy mask is encoded according to varint.

In some embodiments, each block comprises N by N by N cells of the LIDAR data, wherein N is an integer greater than one. In some embodiments, N=4.

In some embodiments, the slice of static map data comprises a cell index for each block that indexes the cells in each block in z-order; and loading the slice of static map data into a cache memory of a parallel processor comprises: loading the cells of the static map data into the cache memory of the parallel processor according to the cell indexes.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Throughputs are a measure of how fast data acquisition systems can output processed data. Throughputs are especially important in data acquisition systems of vehicles such as autonomous vehicles and semi-autonomous vehicles. For example, these data acquisition systems must acquire as much data, and process the data, as fast as possible to help the vehicle make split-second driving decisions (e.g., accelerate, brake, right-turn, left-turn, etc.). As such, it is of critical importance to improve throughputs (or reduce data latencies) of data acquisitions systems.

Under conventional approaches, throughputs of data acquisition systems are limited by the speed at which data are acquired and subsequently processed. In a typical data processing scenario, processing of data does not begin until a data frame (e.g., a complete data file) is first acquired. For example, a data acquisition system can acquire a data frame in 0.5 seconds and process the data frame in another 0.5 seconds. In this example, the throughput of the data acquisition system is one processed data frame every second, or 1 Hz. Also in this example, data latency of the data acquisition system is one second (i.e., time it takes for the data acquisition system to output one processed data frame). Hence, to improve throughput of a data acquisition system, data latency of the data acquisition system needs to be reduced. To reduce the data latency, either data acquisition time or data processing time ought to be reduced.

A claimed solution rooted in computer technology overcomes problems specifically arising in the realm of computer technology. In various embodiments, a data acquisition system performs a method comprising obtaining a slice of static map data representing a static geographical map, wherein each slice represents a horizontal region of the static geographical map, each slice comprises a plurality of blocks, each block comprises a plurality of cells, each cell corresponds to a respective three-dimensional region of the static geographical map, and each cell has a cell value that indicates an object probability that an object is present in the cell; loading the slice of static map data into a cache memory of a parallel processor; arranging the static map data in the cache memory in contiguous memory spaces assigned to a group of workers, or processes, of the parallel processor that have coalescing constraints; obtaining a frame of dynamic map data, wherein the dynamic map data represents LIDAR data collected by a rotating LIDAR sensor on a vehicle; loading the frame of the dynamic map data into the cache memory of the parallel processor; obtaining a plurality of scan match candidates each representing a possible position and attitude of the vehicle; processing, in the parallel processor, the static map data, the dynamic map data, and the plurality of scan match candidates to generate one or more results, wherein each result represents one of the scan match candidates and a score for the one of the scan match candidates; and selecting the scan match candidate having the highest score as a position of the vehicle.

Figure 1:
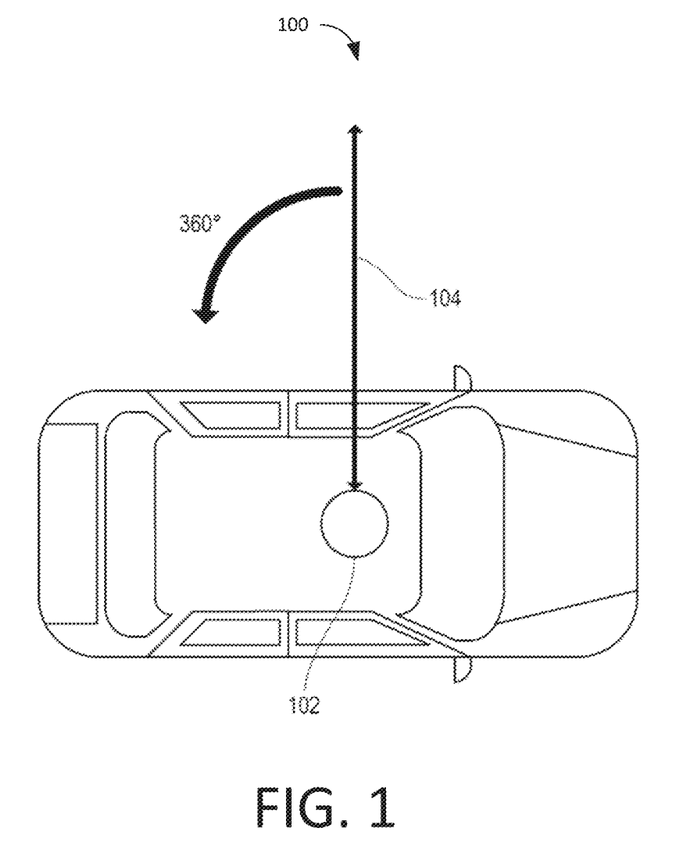
FIG. 1 illustrates an example vehicle, according to various embodiments of the current disclosure.

FIG. 1 illustrates an example vehicle 100, such as an autonomous or semi-autonomous vehicle, according to various embodiments of the current disclosure. The vehicle 100 generally refers to a category of vehicles that are capable of "sensing" an environment around the vehicle 100. The vehicle 100 may include myriad of sensors (e.g., camera, sonar, radar, LIDAR, GPS, etc.) to detect and identify objects in the surrounding environment (e.g., pedestrians, road signs, traffic light, traffic conditions, etc.). In some embodiments, the vehicle 100 may recognize road signs (e.g., speed limit, school zone, construction zone, etc.) and traffic lights (e.g., red light, yellow light, green light, etc.). The vehicle 100 may navigate through various road, street, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein.

In general, the vehicle 100 can effectuate any control to itself that a human driver can on a conventional vehicle. For example, the vehicle 100 can accelerate, brake, turn left or right, or drive in a reverse direction just as a human driver can on a conventional vehicle. The vehicle 100 can also sense environmental conditions, gauge spatial relationships (e.g., distances between objects and itself), detect and analyze road signs just as a human driver can. Moreover, the vehicle 100 can perform more complex operations, such as parallel parking, parking in a crowded parking lot, collision avoidance, etc., without any human input.

In various embodiments, the vehicle 100 may include one or more sensors. As used herein, the one or more sensors may include laser scanning systems (e.g., LIDAR), radar systems, sonar systems, camera systems, and/or the like. The one or more sensors allow the vehicle 100 to sense an environment around the vehicle 100. For example, radar or sonar system can be configured to detect a distance of an object in front of the vehicle 100 using doppler effect of electromagnetic or sound waves respectively. In another example, camera systems can be configured to capture images and process captured images to detect objects, such as road signs, and deciphering meaning of the objects, such as speed limit posted on the road signs.

In some embodiments, the vehicle 100 may include a light detection and ranging (LIDAR) sensor 102. The LIDAR sensor 102 may be mounted on any suitable locations on the vehicle 100 as long as the locations are free of obstructions that may interfere with operation of the lasers. For example, in some embodiments, one or more LIDAR sensors may be mounted on A-pillars (e.g., pillars that holds a front windshield of an automobile) of the vehicle 100. In another example, as shown in the example of FIG. 1, the LIDAR sensor 102 may be mounted on a top or a roof of the vehicle 100. In general, the LIDAR sensor 102 may be utilized to survey an environment surrounding the vehicle 100 by measuring relative distances between objects in the environment and the vehicle 100. The LIDAR sensor 102 does this by illuminating pulsed laser lights 104 and measuring the same pulsed laser lights 104 reflected by the objects. In various embodiments, the LIDAR sensor 102 may include one or more laser lights (e.g., number of channels in the LIDAR sensor 102) along an axis perpendicular to the ground (e.g., a vertical axis of the vehicle 100). In such embodiments, the one or more channels of the laser lights allow the LIDAR sensor 102 to get a two dimensional "view," or a two dimensional map, of the surrounding environment along the vertical axis of the vehicle 100. In some embodiments, the LIDAR sensor 102 may be configured to rotate 360 degrees about a rotational axis to scan the surrounding environment. For example, as shown in the example of FIG. 1, the LIDAR sensor 102 mounted on the top of the vehicle 100 may rotate 360 degrees. The rotation and the one or more channels of the laser lights enable the LIDAR sensor 102 to capture a three dimensional "view," or a three dimensional map, of the objects in the surrounding environment by measuring relative distances of the objects to the LIDAR sensor 102.

As discussed, the LIDAR sensor 102 may be configured to acquire three dimensional maps of objects in a surrounding environment. In some embodiments, the LIDAR sensor 102 may be configured to rotate at 10 Hz (e.g., 10 rotations per second). In some embodiments, the LIDAR sensor 102 may be configured to rotate at a speed that is faster or slower than 10 Hz. In general, the rotational speed of the LIDAR sensor 102 is limited by its hardware, meaning that a LIDAR sensor 102 may rotate as fast as the hardware allows. In various embodiments, a data frame (e.g., a frame of a point cloud data) of the LIDAR sensor 102 comprises one 360 degree scan of the surrounding environment. For example, if the LIDAR sensor 102 rotates at 10 Hz, the LIDAR sensor 102 may acquire or capture ten data frames, or ten 360 degree scans of the surrounding environment, each second.

In various embodiments, acquired data frames (or the acquired frames of the point cloud data) are further processed in order for the vehicle 100 to derive meaningful information from the acquired data frames. For example, distances that a pulsed laser light 104 has traveled may be determined by measuring the time the pulsed laser light 104 took to travel to and from the objects in the surrounding environment. This information may then be used to determine distances between the objects and the LIDAR sensor 102 using speed of light as a conversion factor. In general, time to process data may be added to the time to acquire data. For instance, in the example in which the LIDAR sensor 102 acquires a data frame at 10 Hz, one data frame is acquired or captured every 100 milliseconds. Further, if a data acquisition system takes another 100 milliseconds to process the data frame, the data acquisition system has a throughput of 5 Hz (e.g., five processed data frames a second). In other words, the data acquisition system has a data latency of 200 milliseconds. Therefore, in this example, although the LIDAR sensor 102 may acquire or capture data frames at 10 Hz, the throughput of the LIDAR system (the LIDAR sensor 102 plus the data acquisition system) is 5 Hz.

Although most of the discussion focuses on data acquisition systems associated with LIDAR sensors, the disclosed inventions are not limited to such systems. The disclosed technologies may be applied to any suitable data acquisition systems with any suitable sensors and/or devices in which at least some data is acquired from the sensors and/or devices. For example, the disclosed inventions may be applied to image data acquired from cameras.

Figure 2A:
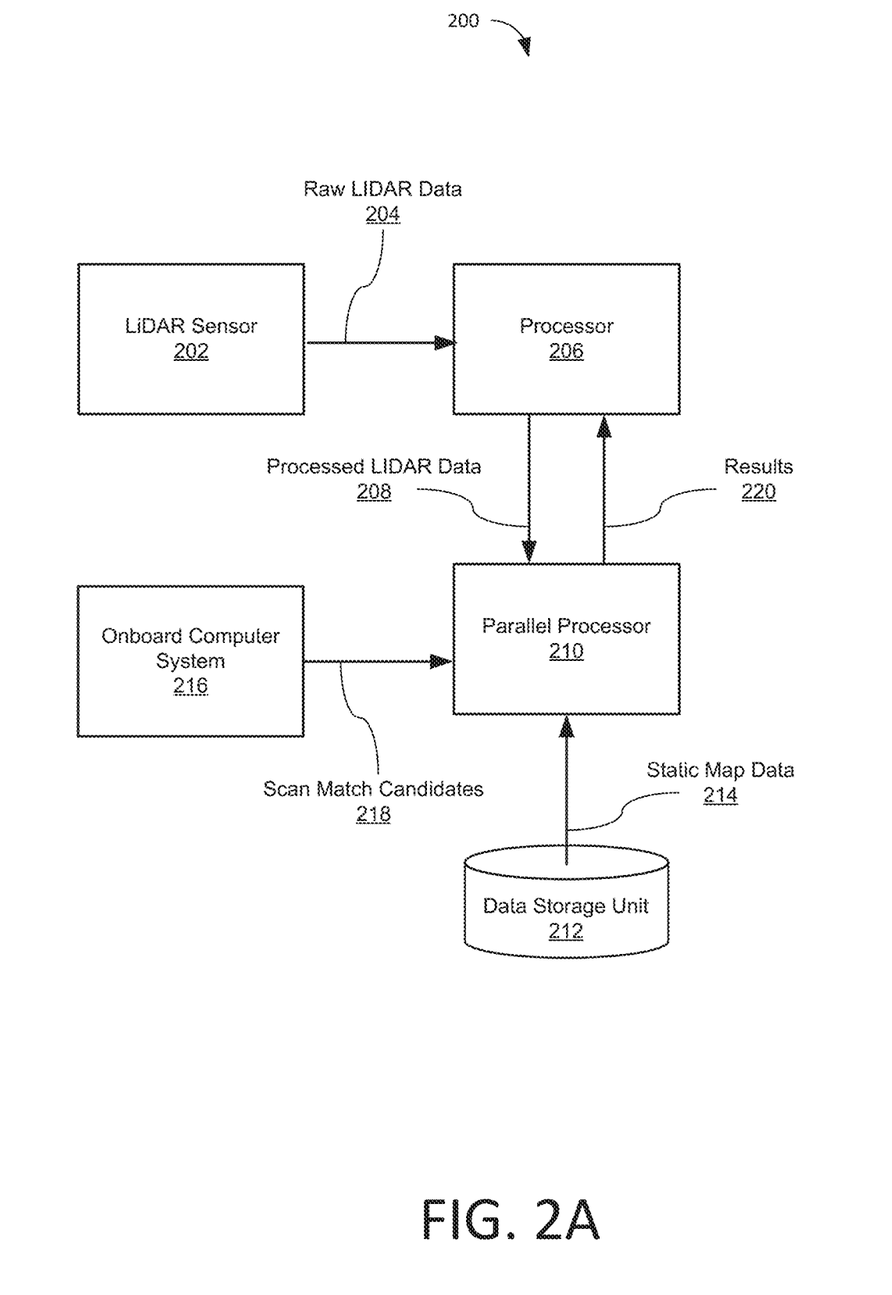
FIG. 2A is a block diagram of an example environment in which the disclosed technology may be implemented.

FIG. 2 is a block diagram of an example environment 200 in which the disclosed technology may be implemented. The example environment 200 may be implemented in a vehicle, for example as described above. Referring to FIG. 2, the example environment 200 may include a LIDAR sensor 202 that generates raw LIDAR data 204. The example environment 200 may include a processor 206. The processor 206 may be implemented as a general-purpose processor such as a central processing unit (CPU) or the like. The processor 206 may process the raw LIDAR data 204 to generate processed LIDAR data 208, for example as described herein.

The example environment 200 may include a data storage unit 212. The data storage unit 212 may store static map data 214. The static map data 214 may include map data that changes infrequently. For example, the static map data 214 may represent persistent features such as roads, buildings, and the like.

The example environment 200 may include an onboard system, which may include an onboard computer system 216. The onboard computer system 216 may generate scan match candidates 218. Each scan match candidate 218 may represent a possible position and attitude of the vehicle. The onboard computer system 216 may generate the scan match candidates 218 according to any suitable technique. In some embodiments, the scan match candidates 218 may be generated randomly.

The example environment 200 may include a parallel processor 210. Parallel processors generally have a large number of computing cores, also referred to as "workers." The parallel processor 210 may be implemented as a graphical processing unit (GPU) or the like, to expedite a speed of the processing compared to a scenario if the processing were conducted on a CPU. The parallel processor 210 may process the processed LIDAR data 208, the static map data 214, and the scan match candidates 218 to generate results 220, for example as described herein. Each of the results 220 may represent one of the scan match candidates 218 and a score for the scan match candidate 218.

The parallel processor 210 may provide the scan match results to the processor 206 for further processing. The processor 206 may select the scan match candidate 218 having the highest score as a position of the vehicle.

Figure 2B:
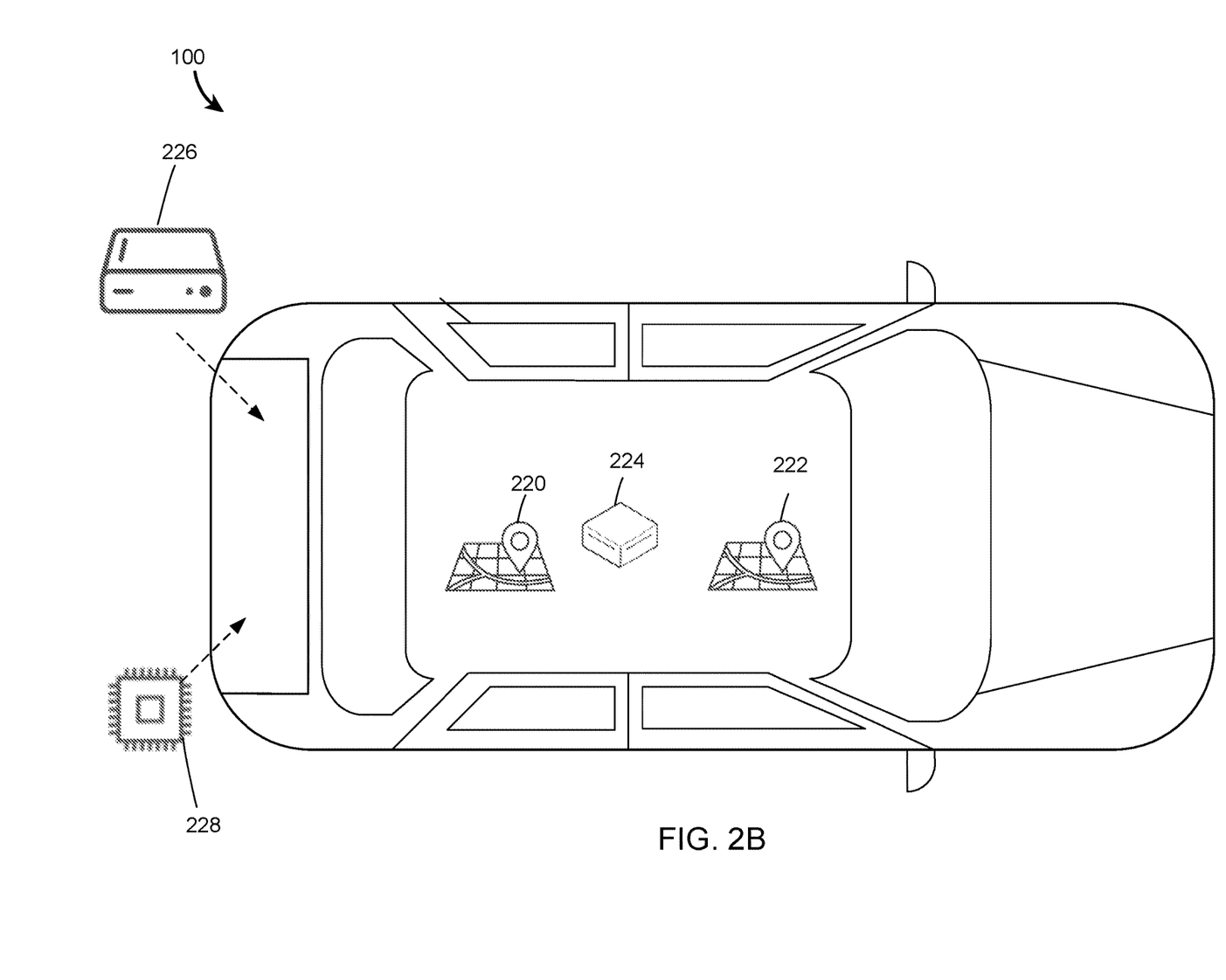
FIG. 2B illustrates an implementation of a parallel processor on an example vehicle, according to various embodiments of the current disclosure.

As shown in FIG. 2B, the parallel processor 210 may include one or more antennae 220 and/or 222 affixed on a roof top of the vehicle 100 to receive the processed LIDAR data 208. The antennae 220 and/or 222 may connect to a nBox 224, an embedded device that decodes the processed LIDAR data 208 and outputs, via an inter-process communication (IPC), the decoded processed LIDAR data to a driver 226. The driver 226 may generate computer-readable GPU measurements to be transmitted to a localization module 228. The localization module may predict a position and attitude of the vehicle 100 at particular times.

Figure 3:
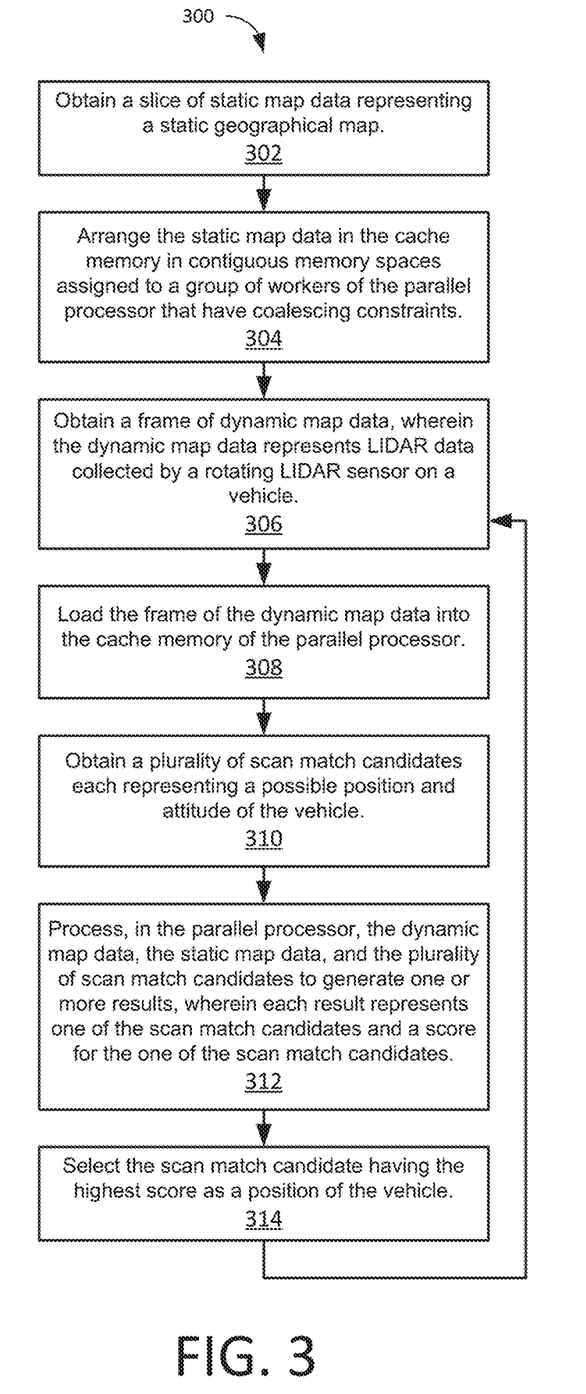
FIG. 3 illustrates a process according to some embodiments of the disclosed technologies.

FIG. 3 illustrates a process 300 according to some embodiments of the disclosed technologies. While elements of the process 300 are presented in a particular arrangement, it should be understood that one or more of the elements of the disclosed processes may be implemented in other arrangements and orders, in parallel, or omitted entirely. The process 300 may be implemented in the example environment 200 of FIG. 2 and/or the vehicle 100 of FIG. 1.

Referring to FIG. 3, the process 300 may include obtaining a slice of static map data 214 representing a static geographical map, at 302. For example, referring again to FIG. 2, the parallel processor 210 may obtain a slice of the static map data 214 from the data storage unit 212. In some embodiments, the slice may be obtained using a three-dimensional rounding buffer. These embodiments facilitate incremental uploads of the static map data 214, which may on average require only one third of each slice to be uploaded, thereby increasing upload speed by 300%.

Figure 4:
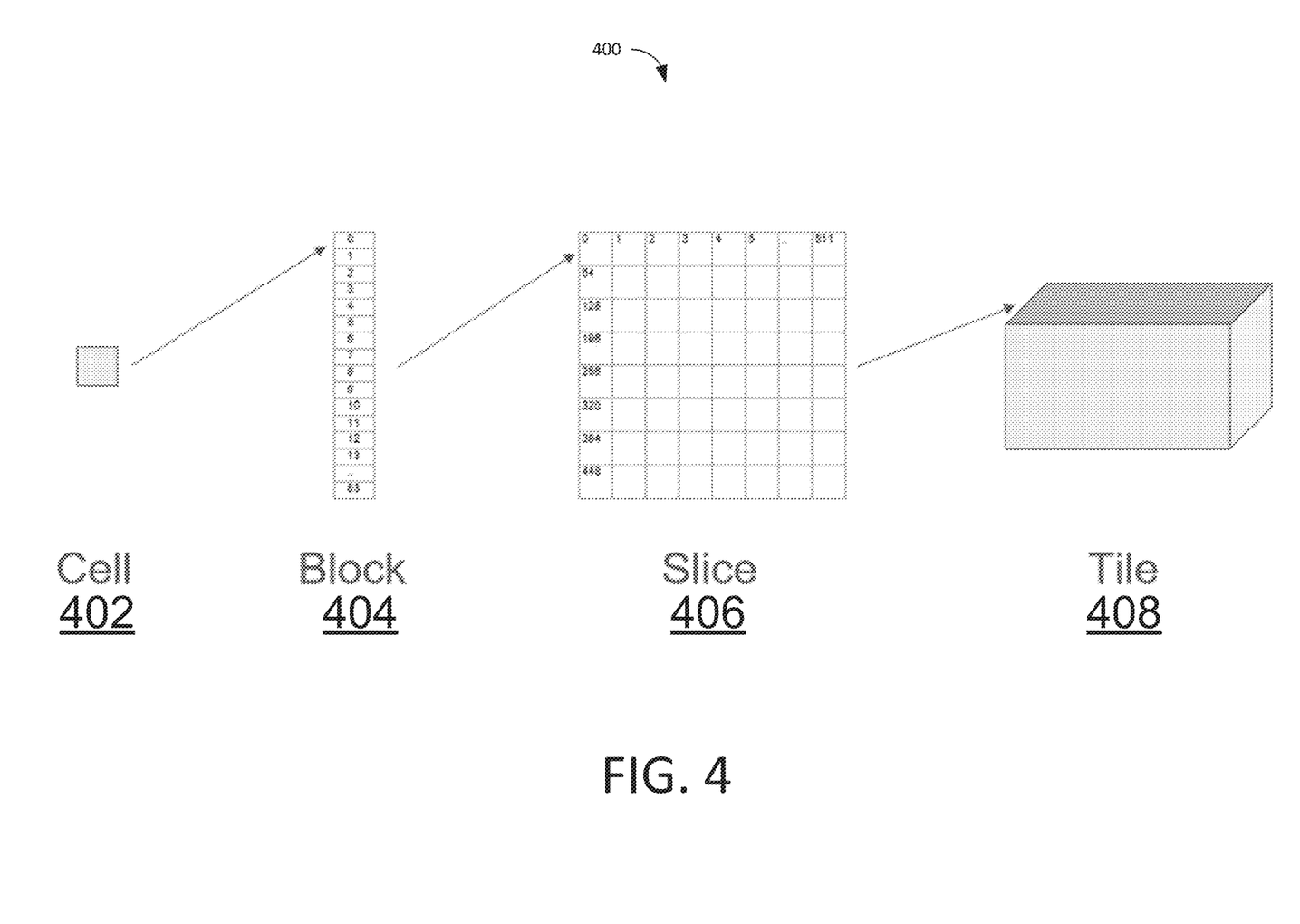
FIG. 4 illustrates organization of the static map data according to some embodiments of the disclosed technologies.

FIG. 4 illustrates organization 400 of the static map data 214 according to some embodiments of the disclosed technologies. Referring to FIG. 4, the smallest unit is a cell 402, which represents a cube in the real world, that is, a three-dimensional region of the static geographical map. In some embodiments, a cell may be 0.125 cubic meters in size. Each cell has a cell value that indicates an object probability that an object is present in the cell.

A block 404 is a group of $N^3$ cells 402, arranged in a N by N by N cube. In some embodiments, N=4.

A slice 406 is a single horizontal layer of blocks 404 arranged in an M by M square. In some embodiments, M=8.

A tile 408 is a stack of slices 406. The number of slices 406 in a tile 408 may vary.

In some embodiments, each slice of static map data comprises a block occupancy mask that identifies the blocks in the slice that contain at least one cell with a non-zero cell value. In such embodiments, loading the slice of static map data into the cache memory of the parallel processor 210 may include loading only the blocks identified by the block occupancy mask. In some embodiments, the block occupancy mask may be a block of 4 by 4 by 4 cells, matching a configuration of the block 404. From experimental results, such a configuration of the block occupancy mask reduces a number of occupied blocks corresponding to the static map data 214 by about half compared to 64 bit occupancy masks that represent 64 cells laid along a y-axis. In some embodiments, the block occupancy mask may be generated according to Group Varint Encoding (GVE), also referred to as "varint." In other embodiments, other encoding techniques may be used. The blocks may be encoded via a sparse block oriented encoding mechanism. Such a mechanism includes counting a number of empty blocks using varint, which indicates a number of blocks to skip, and storing the block occupancy mask using a subblock occupancy mask. The subblock occupancy mask includes a bit to represent an occupied byte in the 64 bit block, following by actual contents of the occupied byte. Such a mechanism simplifies a setup to upload the blocks into the cache memory of the parallel processor 210.

In some embodiments, each slice of the static map data comprises a cell index for each block that indexes the cells in each block in z-order, which improves spatial locality within subblocks, thereby enhancing an efficiency of the sparse block oriented encoding mechanism. Each of the subblocks may represent a 2 by 2 by 2 cell space. In other embodiments, other indexing techniques may be used. In these embodiments, loading a slice of the static map data into the cache memory of the parallel processor may include loading the cells of the static map data into the cache memory of the parallel processor according to the cell indexes.

Referring again to FIG. 3, the process 300 may include arranging the static map data in the cache memory, such as in a L1 cache, in contiguous memory spaces assigned to a group of workers of the parallel processor that have coalescing constraints, at 304. Coalescing constraints may refer to constraints required in order for multiple memory accesses in the contiguous memory spaces to be combined in a single transaction. For example, referring again to FIG. 2, the parallel processor 210 may execute a process to arrange the static map data 214 in the cache memory of the parallel processor 210. In the parallel processor 210, a group of 32 contiguous threads, also referred to as a "warp", may access adjacent words of the static map data 214 in the cache memory in a single transaction. This arrangement greatly increases the cache access speeds by reducing a number of transactions in which the cache memory is accessed. Accessing memory frequently results in a processing bottleneck that slows down processing speeds.

Referring again to FIG. 3, the process 300 may include obtaining a frame of dynamic map data, wherein the dynamic map data represents LIDAR data collected by a rotating LIDAR sensor on a vehicle, at 306. For example, referring again to FIG. 2, the processor 206 may receive the raw LIDAR data 204 from the LIDAR sensor 202, and may process the raw LIDAR data 204. In some embodiments, a frame of the raw LIDAR data 204 is obtained ten times each second. The frame may include a plurality of "skylines" taken at multiple angles during a 360-degree rotation of the LIDAR sensor. Each skyline may include data collected by a vertical stack of 62 lasers. For example, each frame may include on the order of 10,000 to 100,000 LIDAR points.

Referring again to FIG. 3, the process 300 may include loading the frame of the dynamic map data into a cache memory of the parallel processor, at 308. For example, referring again to FIG. 2, the processor 206 may load a frame of the processed LIDAR data 208 into a cache memory of the parallel processor 210.

Referring again to FIG. 3, the process 300 may include obtaining a plurality of scan match candidates each representing a possible position and attitude of the vehicle, at 310. For example, referring again to FIG. 2, the parallel processor 210 may obtain scan match candidates 218 from the onboard computer system 216. The onboard computer system 216 may generate the scan match candidates 218 according to any suitable technique. In some embodiments, onboard computer system 216 may generate the scan match candidates 218 randomly.

Referring again to FIG. 3, the process 300 may include processing, in the parallel processor 210, the dynamic map data, the static map data, and the plurality of scan match candidates to generate one or more results, wherein each result represents one of the scan match candidates and a score for the one of the scan match candidates, at 312. For example, referring again to FIG. 2, the parallel processor 210 may process the LIDAR data 208, the static map data 214, and the plurality of scan match candidates 218 to generate one or more results 220. Any suitable technique may be employed for this processing. For example, the parallel processor 210 may process pairs each comprising a point of the LIDAR data 208 and one of the scan match candidates 218 to generate a preliminary score. In some embodiments, a rigid-body transformation, which may include a rotation and a translation, from the LIDAR data 208 to the one of the scan match candidates 218 such that a deviation from the LIDAR data 208 following the rigid-body transformation to the one of the scan match candidates 218 is minimized, may be employed. Each pair may be compared to each of the cell values to generate a score for the pair. Each result 220 may include one of the scan match candidates 218 and its score.

Referring again to FIG. 3, the process 300 may include selecting the scan match candidate having the highest score as a position of the vehicle, at 314. For example, referring again to FIG. 2, the parallel processor 210 may provide the results 220 to the processor 206, which may select the result 220 having the highest score as the position of the vehicle. The processor 206 may provide that position to the onboard computer system 216 for use in navigating the vehicle. In other embodiments, the parallel processor 210 may provide the results 220 directly to the onboard computer system 216.

Referring again to FIG. 3, the process 300 may continue with obtaining a further frame of dynamic map data, at 306, loading the further frame of dynamic map data into the cache memory of the parallel processor, at 308, obtaining a further plurality of scan match candidates, at 310, processing, in the parallel processor, the further dynamic map data, the further plurality of scan match candidates, and the same static map data to generate one or more further results, wherein each further result represents one of the further scan match candidates and a score for the one of the further scan match candidates. These steps may be repeated as many times as desired. As the vehicle moves beyond the geographic region described by the slice, other slices of the static map data 214 may be obtained from the data storage unit 212.

Embodiments of the disclosed technologies feature several advantages. The disclosed techniques greatly increase the efficiency of uploading the static map data to the parallel processor, resulting in a speed increase of approximately 15 times. For example, as noted above, once the static map data is loaded and arranged in the cache memory of the parallel processor, that static map data can be reused with new dynamic map data and new scan match candidates multiple times without reloading further static map data because the parallel processor arranges the static map data in the cache memory in contiguous memory spaces assigned to a group of workers of the parallel processor that have coalescing constraints.

Figure 5:
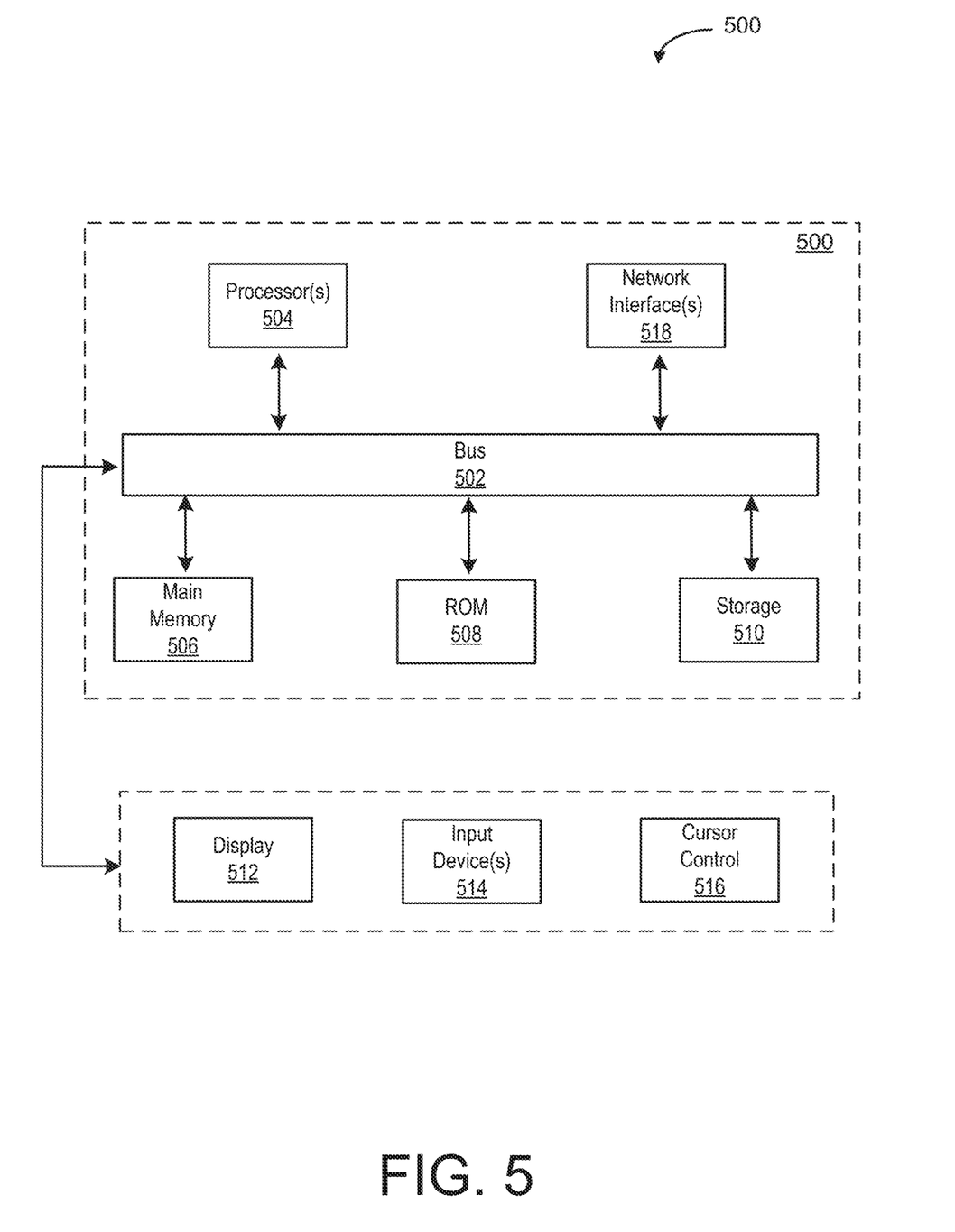
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform a method comprising:
obtaining, using a three-dimensional rounding buffer, a slice of static map data representing a static geographical map, wherein:
each slice represents a horizontal region of the static geographical map;
each slice comprises a plurality of blocks;
each block comprises a plurality of cells;
each cell corresponds to a respective three-dimensional region of the static geographical map; and
each cell has a cell value that indicates an object probability that an object is present in the cell;
loading the slice of static map data into a cache memory of a parallel processor;
arranging the static map data in the cache memory in contiguous memory spaces assigned to a group of workers of the parallel processor that have coalescing constraints, wherein the coalescing constraints comprise requirements in order for multiple memory access in the contiguous memory spaces to be combined in a single transaction;
obtaining a frame of dynamic map data, wherein the dynamic map data represents LIDAR data collected by a rotating LIDAR sensor on a vehicle;
loading the frame of the dynamic map data into the cache memory of the parallel processor;
obtaining a plurality of scan match candidates each representing a possible position and attitude of the vehicle;
processing, in the parallel processor, the static map data, the dynamic map data, and the plurality of scan match candidates to generate one or more results, wherein each result represents one of the scan match candidates and a score for the one of the scan match candidates; and
selecting the scan match candidate having the highest score as a position of the vehicle.

2. The system of claim 1, wherein the instructions further cause the system to perform:
obtaining a further frame of the dynamic map data;
loading the further frame of the dynamic map data into the cache memory of the parallel processor;
obtaining a further plurality of the scan match candidates;
processing, in the parallel processor, the further frame of the dynamic map data, the further plurality of the scan match candidates, and the static map data, to generate one or more further results, wherein each further result represents a further one of the scan match candidates and a further score for the one of the scan match candidates; and
selecting the further scan match candidate having the highest score as a further position of the vehicle.

3. The system of claim 1, wherein:
the slice of static map data comprises a block occupancy mask that identifies blocks containing at least one cell with a non-zero cell value; and
loading the slice of static map data into a cache memory of a parallel processor comprises: loading only blocks identified by the block occupancy mask.

4. The system of claim 3, wherein:
the block occupancy mask is encoded according to Group Varint Encoding (GVE), which indicates a number of blocks to skip.

5. The system of claim 3, wherein:
each block comprises N by N by N cells of the LIDAR data; and
N is an integer greater than one.

6. The system of claim 5, wherein:

the slice of static map data comprises a cell index for each block that indexes the cells in each block in z-order; and loading the slice of static map data into a cache memory of a parallel processor comprises: loading the cells of the static map data into the cache memory of the parallel processor according to the cell indexes.

7. The system of claim 1, wherein 32 contiguous threads access adjacent words of the static map data in the cache memory in a single transaction.

8. A non-transitory computer readable medium comprising instructions that, when executed, cause one or more processors to perform a method comprising:

obtaining, using a three-dimensional rounding buffer, a slice of static map data representing a static geographical map, wherein each slice represents a horizontal region of the static geographical map, wherein each slice comprises a plurality of blocks, wherein each block comprises a plurality of cells, wherein each cell corresponds to a respective three-dimensional region of the static geographical map, and wherein each cell has a cell value that indicates an object probability that an object is present in the cell;

loading the slice of static map data into a cache memory of a parallel processor;

arranging the static map data in the cache memory in contiguous memory spaces assigned to a group of workers of the parallel processor that have coalescing constraints, wherein the coalescing constraints comprise requirements in order for multiple memory access in the contiguous memory spaces to be combined in a single transaction;

obtaining a frame of dynamic map data, wherein the dynamic map data represents LIDAR data collected by a rotating LIDAR sensor on a vehicle;

loading the frame of the dynamic map data into the cache memory of the parallel processor;

obtaining a plurality of scan match candidates each representing a possible position and attitude of the vehicle;

processing, in the parallel processor, the static map data, the dynamic map data, and the plurality of scan match candidates to generate one or more results, wherein each result represents one of the scan match candidates and a score for the one of the scan match candidates; and selecting the scan match candidate having the highest score as a position of the vehicle.

9. The non-transitory computer readable medium of claim 8, wherein the instructions further cause the one or more processors to perform:

obtaining a further frame of the dynamic map data;
loading the further frame of the dynamic map data into the cache memory of the parallel processor;
obtaining a further plurality of the scan match candidates;
processing, in the parallel processor, the further frame of the dynamic map data, the further plurality of the scan match candidates, and the static map data, to generate one or more further results, wherein each further result represents a further one of the scan match candidates and a further score for the one of the scan match candidates; and
selecting the further scan match candidate having the highest score as a further position of the vehicle.

10. The non-transitory computer readable medium of claim 8, wherein:

the slice of static map data comprises a block occupancy mask that identifies blocks containing at least one cell with a non-zero cell value; and loading the slice of static map data into a cache memory of a parallel processor comprises: loading only blocks identified by the block occupancy mask.

11. The non-transitory computer readable medium of claim 10, wherein:

the block occupancy mask is encoded according to Group Varint Encoding (GVE).

12. The non-transitory computer readable medium of claim 10, wherein:

each block comprises N by N by N cells of the LIDAR data; and

N is an integer greater than one.

13. The non-transitory computer readable medium of claim 12, wherein:

the slice of static map data comprises a cell index for each block that indexes the cells in each block in z-order; and loading the slice of static map data into a cache memory of a parallel processor comprises: loading the cells of the static map data into the cache memory of the parallel processor according to the cell indexes.

14. The non-transitory computer readable medium of claim 12, wherein N=4.

15. A method, comprising:

obtaining, using a three-dimensional rounding buffer, a slice of static map data representing a static geographical map, wherein each slice represents a horizontal region of the static geographical map, wherein each slice comprises a plurality of blocks, wherein each block comprises a plurality of cells, wherein each cell corresponds to a respective three-dimensional region of the static geographical map, and wherein each cell has a cell value that indicates an object probability that an object is present in the cell;

loading the slice of static map data into a cache memory of a parallel processor;

arranging the static map data in the cache memory in contiguous memory spaces assigned to a group of workers of the parallel processor that have coalescing constraints, wherein the coalescing constraints comprise requirements in order for multiple memory access in the contiguous memory spaces to be combined in a single transaction;

obtaining a frame of dynamic map data, wherein the dynamic map data represents LIDAR data collected by a rotating LIDAR sensor on a vehicle;

loading the frame of the dynamic map data into the cache memory of the parallel processor;

obtaining a plurality of scan match candidates each representing a possible position and attitude of the vehicle;

processing, in the parallel processor, the static map data, the dynamic map data, and the plurality of scan match candidates to generate one or more results, wherein each result represents one of the scan match candidates and a score for the one of the scan match candidates; and selecting the scan match candidate having the highest score as a position of the vehicle.

16. The method of claim 15, further comprising:
obtaining a further frame of the dynamic map data;
loading the further frame of the dynamic map data into the cache memory of the parallel processor;
obtaining a further plurality of the scan match candidates;

processing, in the parallel processor, the further frame of the dynamic map data, the further plurality of the scan match candidates, and the static map data, to generate one or more further results, wherein each further result represents a further one of the scan match candidates and a further score for the one of the scan match candidates; and selecting the further scan match candidate having the highest score as a further position of the vehicle.

17. The method of claim 15, wherein:

the slice of static map data comprises a block occupancy mask that identifies blocks containing at least one cell with a non-zero cell value; and loading the slice of static map data into a cache memory of a parallel processor comprises: loading only blocks identified by the block occupancy mask.

18. The method of claim 17, wherein:

the block occupancy mask is encoded according to Group Varint Encoding (GVE).

19. The method of claim 17, wherein each block comprises N by N by N cells of the LIDAR data, wherein N is an integer, wherein N>1.

20. The method of claim 19, wherein:

the slice of static map data comprises a cell index for each block that indexes the cells in each block in z-order; and loading the slice of static map data into a cache memory of a parallel processor comprises: loading the cells of the static map data into the cache memory of the parallel processor according to the cell indexes.

* * * * *